United States Patent [19]
Valkanas et al.

[11] Patent Number: 5,766,476
[45] Date of Patent: Jun. 16, 1998

[54] METHOD FOR CLEANING CONTAMINATED WATER

[75] Inventors: George N. Valkanas, Maroussi; Apostolos G. Vlyssides, Attica, both of Greece

[73] Assignee: Innoval Management Limited, Curacao, Netherlands Antilles

[21] Appl. No.: 676,209

[22] PCT Filed: Sep. 13, 1995

[86] PCT No.: PCT/GR95/00017

§ 371 Date: Jul. 19, 1996

§ 102(e) Date: Jul. 19, 1996

[87] PCT Pub. No.: WO96/09253

PCT Pub. Date: Mar. 28, 1996

[30] Foreign Application Priority Data

Sep. 13, 1994 [GR] Greece ................. 940100424

[51] Int. Cl.$^6$ ............... C02F 3/30; C02F 1/42
[52] U.S. Cl. ............. 210/605; 210/624; 210/626; 210/630; 210/631; 210/663; 210/903; 210/906; 210/912
[58] Field of Search ................. 210/602, 605, 210/615, 616, 620, 622, 623, 624, 626, 630, 631, 663, 688, 903, 906, 912

[56] References Cited

U.S. PATENT DOCUMENTS

| | | | |
|---|---|---|---|
| 3,964,998 | 6/1976 | Barnard | 210/626 |
| 4,159,944 | 7/1979 | Erickson et al. | 210/626 |
| 5,137,625 | 8/1992 | Wolverton | 210/602 |
| 5,174,897 | 12/1992 | Wengrzynek | 210/602 |

(List continued on next page.)

FOREIGN PATENT DOCUMENTS

| | | |
|---|---|---|
| 0368814 | 5/1990 | European Pat. Off. |
| 2456712 | 12/1980 | France. |

(List continued on next page.)

*Primary Examiner*—Neil McCarthy
*Assistant Examiner*—Theodore M. Green
*Attorney, Agent, or Firm*—Birch, Stewart, Kolasch & Birch, LLP

[57] ABSTRACT

This invention refers to an original solution for the purification of contaminated water streams with the activated sludge method, involving: a) a two-stage aeration system operating at high rate and low rate conditions respectively, where the first stage operates in anoxic conditions promoting denitration, whereas the second stage operates under oxidant conditions so that nitrates are removed to an extent of 70%; b) a system for moving the biological sludge, where the sludge produced in the first aeration tank is totally rejected, and that produced in the second aeration tank is recycled to the first. By disposing of the sludge from the first aeration tank, 70–80% of the phosphate content are removed and the system is relieved of toxicity; c) a system using special ion exchanging resins enclosed in a casing, which are inflatable in water by a factor of 200–350, which have a high ion exchange capacity, and which bind the total metal ions presents; d) in the course of the biological treatment, the thermal activation of the biological culture is introduced by recycling the culture to the first aeration tank, where conditions of toxicity related biological stress develop on the culture, so that thermal activation and selectivity of species are promoted in it; e) following the above, the installation for cleaning contaminated water operates to specification with a very high and steady yield, achieving water purification to an extent of BOD reduction by 95% and with the option for the application of tertiary purification with the development of aquatic plants, leading to the production of recycled water of BOD<5 and hardness <10 in a simple and cost-effective manner. The biological treatment process described constitutes a method for optimizing water purification installations operating with the activated sludge method. It is most suitable for use with installations located in warm climate regions where the oxygen supply in the aeration tanks is reduced due to the high temperature of the contaminated water and where the need for recycling water is maximal.

10 Claims, 1 Drawing Sheet

U.S. PATENT DOCUMENTS

| | | | |
|---|---|---|---|
| 5,252,214 | 10/1993 | Lorenz et al. | 210/605 |
| 5,342,522 | 8/1994 | Marsman et al. | 210/605 |
| 5,364,451 | 11/1994 | Raskin et al. | 210/602 |
| 5,407,576 | 4/1995 | Wolf et al. | 210/631 |
| 5,462,666 | 10/1995 | Kimmel | 210/602 |
| 5,476,750 | 12/1995 | Rahman et al. | 210/688 |

FOREIGN PATENT DOCUMENTS

| | | |
|---|---|---|
| 3912921 | 10/1990 | Netherlands. |
| 3939732 | 6/1991 | Netherlands. |
| 4036548 | 5/1992 | Netherlands. |

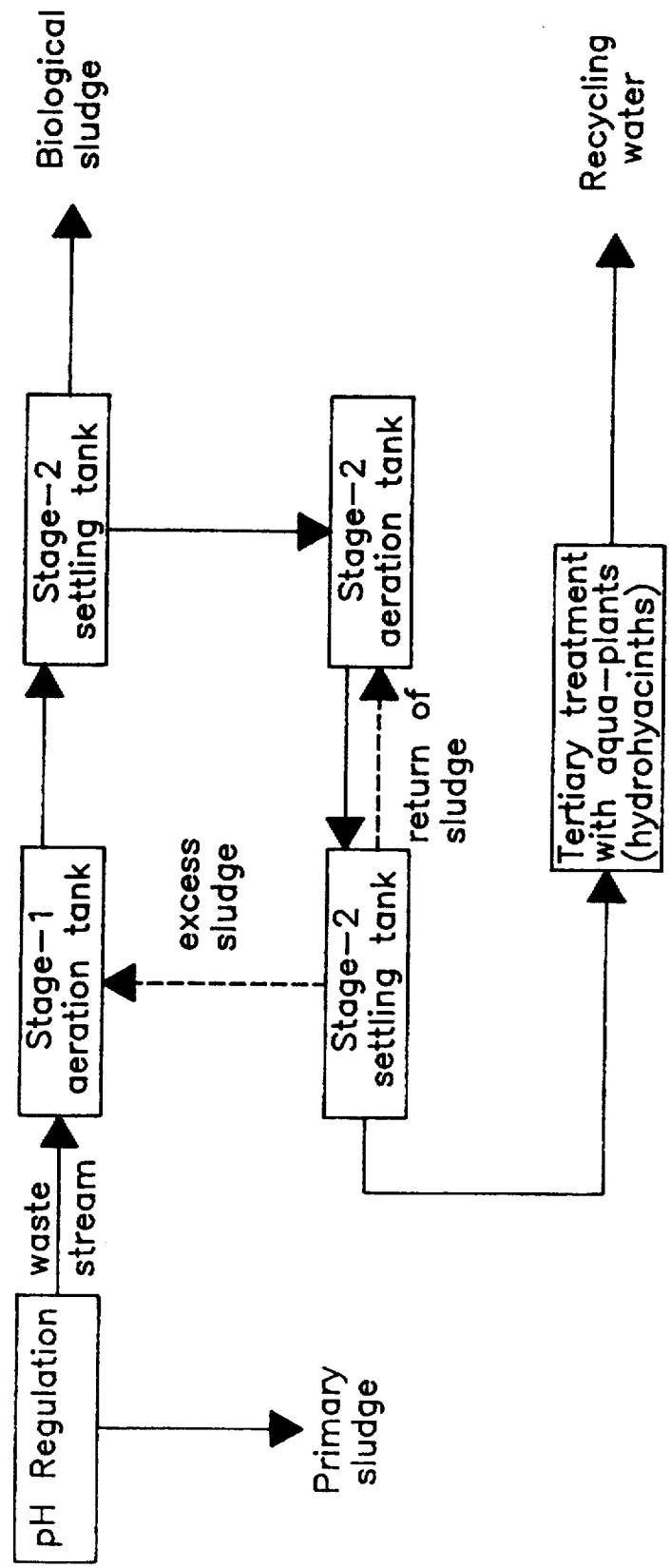

METHOD FOR CLEANING CONTAMINATED WATER

Our invention refers to a method for cleaning contaminated domestic and industrial effluent water streams with the active sludge method and by the introduction of innovative processes for treating the ammoniate and phosphate contents of such streams and for the promotion of the activation of biological culture. The methods achieves a high degree of purification at a rapid rate. It results in obtaining recycle water of a high purity, using low installation and operating cost equipment.

The activated sludge method for cleaning contaminated water has a very wide range of applications and is often simply referred to as the method for biological treatment of contaminated water. It employs a tank for primary settling, an aeration tank and a tank for secondary settling. In the course of its development, multi-stage systems have been introduced, where two- or three- stage aeration is conducted. The two- stage aeration method is combined with the development of conditions for the growth of bacteria only in the primary settling tank and for the growth of higher micro-organisms (such as protozoa and other) in the secondary settling tank. This has also required the adjustment of the residence times in the to tanks. Furthermore, multi-stage systems for the treatment of ammoniates and phosphates present in the contaminated water stream have been developed.

The process of biological treatment of contaminated water with the activated sludge method is characterised by the residence times in high rate processes and low rate processes. The high rate process, with a residence time of 2.5 hours appears to favour the growth of bacteria principally, whereas the low rate process favours the growth of a variety of micro-organisms where bacteria and protozoa are the principal constituents, depending on the residence times, usually being in the range of 4 to 6 hours. The high rate process has a small oxygen consumption and maintains a small concentration of a biological culture in the order of 500 kg./liter. It responds positively to a rise in temperature up to 45° C., achieves high degrees of purification, up to 70%, and requires a small consumption of energy. The low rate process, however, does not benefit from rising the temperature above 20° C., operates in an excess biological culture concentration of 3000 kg/ litter and has high operating costs associated with it.

It is also known that in warm-climate regions, the sewage or industrial waste end-up in aeration tanks where temperatures in excess of 30° C. prevail. Thus, air solubility in such tanks is limited. The saturation oxygen content at 15 Celsius is 10.4 kg/lit, whereas this drops to 6.6 kg/lit at 35 Celsius. Thus, extended aeration installations tend to underperform in such regions.

It is derived from the analysis above that the method for contaminated water purification by the activated sludge method is not effectively studied nor optimised as yet. Among functionality problems associated with it, one could list:

it has particular adaptation problems when the temperature of the contaminated water stream rises.

as sewage and industrial waste are complex materials always carrying toxicity, in the form of organic toxic matter and heavy toxic metals, to a higher or lesser degree, the approach is rather of theoretical importance the toxicity has a variable composition and intensity and inhibits the development of the biological culture and the rate of the biological treatment, thus leading to serious economic and environmental drawbacks.

Taking into account the above mentioned advantageous and disadvantageous aspects of the biological treatment of contaminated water with the activated sludge method, the inventors have invented, researched and operated pilot solutions which manage to handle all these aspects successfully and highly beneficially.

BRIEF DESCRIPTION OF THE DRAWING

A pilot plan diagram of the instant invention.

The inventors have proved that the process of biological treatment of contaminated water with the method of the activated sludge can be optimally operated in a two-stage aeration process in a process, where the first stage operates in a non-acidic environment with removal of nitrates and acting as a toxicity trap. According to this solution, the biological culture in the first aeration tank also acts as an adsorber of heavy metals and toxicity. This culture is totally removed and is not recycled into the system. Following disposition of the sludge from the first aeration tank, phosphate removal is also accomplished, to a degree in excess of 70%. Active sludge is developed and maintained in the second aeration tank which operates in highly oxidant conditions by promoting, the oxidation of ammoniates to nitrates and by recycling the sludge for providing for sludge requirements in both aeration tanks.

During the purification process involving two-stage aeration, the sludge from the second stage is only employed. This sludge is entered into the first aeration tank which contains toxicity, thus resulting to the development of competition between micro-organisms for their survival. Thus, the most resilient and active of bacteria which express the higher energy levels of micro-organism development, prevail. These operating conditions are defined as thermophilic activation of the biological culture. This thermophilic activation will develop to a steady state for the whole purification system, where in the first tank development conditions will involve competition of species by the application of toxic stress, whereas in the second aeration tank seeds of activated biological culture will be conveyed and optimum conditions for the development of biological sludge will prevail.

The combination of a high rate and a low rate process developed and operating as a toxicity trap is an original and optimised solution applicable to the warm climate regions. It is also a highly original and simple solution leading to a high degree of nitrate and phosphate removal. It has been shown that the rate of nitrate removal in a high rate process conditions, developing in a non-acidic environment with a continuous recycle of a water load with sludge from the second, low rate process tank (where oxidant conditions prevail leading to nitrate formation) is in the order of 60–80%. In parallel, as the biological sludge from the first aeration tank is totally rejected, a high fraction of the phosphates (60–80% of total contents) is also received.

The inventors have also invented, elaborated and operated solutions for the toxic relief of the installations for cleaning contaminated water with the activated sludge method, by introducing means for the selective binding of the heavy metals supplied and for the introduction of primary settling conditions for the reduction of the pollutant load in the tank.

The heavy metals in the form of ions are bound to ion-exchanging resins of a special type, invented and operated by the same inventors. Such resins are positioned onto a bed where from the contaminated water passes. The ion exchanging resins are polymer to macroplegmatic structure of an Mc value of 50,000 conversion products. Sulfonic and carboxylic groups have been inserted to these resins to a maximum density to ion exchange ratio near the theoretical 5.6–6.2 limit. Such resins are inflated in water 250–350 fold their weight, and, having low porosity, they bind rapidly the total of metal ions passing through, carried by the water.

The ion exchanging resins mentioned above are added to the aeration tanks. As they are inflated 250–350 fold in water, they bind the soluble metal ions, whereas due to their low porosity the sludge cannot flow through.

By the addition of alkaline water, the pH in the primary settling tank is regulated to a value of 8.3. Under such conditions it has been shown that the largest proportion of the suspended material settles, leading to a reduction of environmental load in the order of 40–50%, with a total binding of phosphates by the calcium ions present. Thus, conditions for reducing the pollutant load in cases of intensive operation of the biological treatment plant are developed. Alkaline water is formed, by the treatment of the sludge in an anaerobic digestion process in the thermophilic region. This process is documented in patent 90117377/3/10 filed by the same inventors.

The improvements to the contaminated water treatment method of activated sludge proposed by this invention lead to the operation of such plants in an effective, trouble-free manner, achieving high rates of purification, a reduced operating cost and operation according to specifications.

The installations for cleaning contaminated water as developed by this invention achieves the full removal of toxicity, a high rate of evolution, and a low operating cost. It can operate without a primary settling tank, especially when the solids suspended in the contaminated water stream have a concentration inferior than 5000 kg./litter. The process as a whole achieves purification to a degree of BOD reduction in the order of 98% and can be combined with a unit for the development of aquatic plants where auxiliary nitrate, phosphate and pollutant removal develops. Such a combination has a small installation and operation cost and can achieve the production of recycle water meeting high purity specifications and a quality biological evolution. In general, what has been described and developed in this invention is a modern approach for the evolution of installations for contaminated water purification which has a highest economic, scientific and environmental significance.

EXAMPLE NO 1

In the pilot plant of the attached drawing, which is located at the end of the central sewage duct of the Greater Athens area, and which is fed at a flowrate of 20 lit/h., the effectiveness of the water cleaning process was investigated: The contaminated water stream was fed with a BOD load of 320+/−100, a suspended solids concentration of 520+/−140 containing heavy metals at a concentration of 200 kg./lit, ammoniates at 100 kg./lt., and phosphates at a quantity of 60 kg./lt. The pilot unit operated for 45 days with no problems at the following operating parameters:

Suspended solids in the first aeration tank: 480+/−50 kg./litter

Suspended solids in the second aeration tank: 5300+/−150 kg./litter

Aeration in the first aeration tank: 1–1.1 cu.m./h

Aeration in the second aeration tank: 1.4–1.7 cu.m./h

The outlet stream had a BOD load of 30+/−5 and a COD load of 45+/−10. 65 +/−5% of heavy metals were bound in the first aeration tank, nitrate removal at 82% was achieved, whereas phosphate binding by the rejected sludge was in the order of 72%.

EXAMPLE NO 2

A second pilot unit involving a single aeration tank of a size equal to the total of the two tanks of the first unit was operated for the treatment of a supply of 20 litters/hour, as well. The relative performance of the two units was investigated in terms of BOD reduction at the outlet.

Results are summarised below:

|  | Pilot Unit of drawing attached | Second pilot unit involving single stage aeration |
| --- | --- | --- |
| 24 hrs | 60 +/− 10 | 180 +/− 50 |
| 48 hrs | 40 +/− 4 | 150 +/− 60 |
| 72 hrs | 25 +/− 5 | 150 +/− 60 |

EXAMPLE NO 3

In the pilot unit illustrated in the drawing attached, a quantity of 50 gram of ion exchange resin was placed in a casing suspended in the aeration tank. This resin was inflatable in water up to 300 fold, with a dehardening ability of 5.2 degrees. The result of this addition was the total elimination of metals during the experiment. Furthermore, the biological culture in the second tank developed without any disruption, resulting in a significant improvement of the rate and the degree of purification. During the 25 days of operation of the unit at conditions similar to those of experiment 1,the outlet BOD was 15+/−5 with a steady yield since the first day of operation and an air consumption of 2.3 cu. m./minute.

Following the end of the experiment, the ion exchange resins exhibited a reduced ion exchange ability. They were removed, reactivated by submersion in salted water (sea water) and reset to operation. At these conditions, the influence of the residence time on the degree of purification was investigated with the following results:

| Flowrate, lit/h. | Outlet BOD | Air Consumption, cu.m./h. |
| --- | --- | --- |
| 20 | 18 +/− 5 | 2.2 |
| 23 | 20 +/− 6 | 2.3 |
| 26 | 20.5 +/− 6 | 2.3 |
| 30 | 19.8 +/− 8 | 2.3 |

It was found that with an increase in the flow by 50%, the cleaning system is adapted to optimum operating conditions and that the degree of purification remains steady.

EXAMPLE NO 4

In the pilot unit illustrated in the attached Drawing, fed at a flowrate of 20 litters/hour at a contaminated water stream composition of the experiment no 1, the influence of the rate and time of recycle on the degree of purification in the two aeration tanks was investigated;

Aeration tank No. 1:
Sludge production: 3750 +/− 200 kg./h.
Quantity and rate of sludge recycle

|  | Own sludge % | from tank 2 | Outlet BOD |
| --- | --- | --- | --- |
| 1–48 h. | 100% | 0 | 290 +/− 10 |
| 1–48 h. | 50% | 50% | 220 +/− 20 |
| 1–48 h. | 0 | 100% | 140 +/− 10 |
| 1–48 h. | 0 | 100% | 290 +/− 10 |

-continued

Aeration tank No. 2:
Sludge production: 4000 +/− 300 kg./h.

| Outlet BOD | aeration, cu.m./h. | |
|---|---|---|
| 160 +/− 8 | 3.8 | Note a) |
| 130 +/− 6 | 3.2 | Note b) |
| 35 +/− 5 | 2.7 | Note c) |
| 25 +/− 5 | 2.2 | Note d) | a) After 5 hours of operation the aeration tank does not exhibit biological activity b) The operation of the aeration tank exhibits reduced biological activity c) The sludge in the aeration tank has some activity and a light colour d) Following placement of a casing with ion exchange resins in the second aeration tank.

EXAMPLE NO 5

The effluent water from the purification installations with a BOD of 20–100 is passed to a tank for the development of aquatic plants (aquatic hyacinths, aquatic celery, etc.) operating at greenhouse conditions covered with a transparent polymer which permits the sun-rays to pass. The aquatic plants develop very rapidly and the final outflow water has a BOD less than 2 and a hardening factor of 10. Thus, it is a high quality recycle water. The aquatic plants can be cut and transferred to the anaerobic digestion unit or be used for making animal foodstuffs.

We claim:

1. A method for biologically treating contaminated water using a two stage aeration system which comprises a first aeration tank and a second aeration tank comprising the following steps:

a) in the first stage, introducing contaminated water into the first aeration tank where the aeration tank has an anoxic environment, and a resulting treated sludge is removed from the system, and about 70–80% of the phosphate and nitrate content of the contaminated water is removed;

b) in the second stage, water from the first stage is introduced into the second aeration tank which operates under oxidizing conditions which produces nitrates, and a resultant treated sludge is recycled and excess sludge is introduced into the first aeration tank, wherein either or both aeration tanks contain ion exchanging resins which are inflatable in water by a factor of 200–350 and bind soluble metal ions.

2. The method according to claim 1, where a toxic material supplied to the system is adsorbed by a rejected sludge of the first aeration tank which is fed with the sludge recycled from the second aeration tank and conditions of biological selectivity are created with a continuous activation of the biological culture.

3. The method according to claim 1, where the second aeration tank operates at conditions for thermophilic activation of micro-organisms, wherein said conditions are free of heavy metals in the presence of ion exchanging resins which are inflatable up to 350 fold in water.

4. The method according to any one of claims 1, 2, and 3, where the introduction of contaminated water or toxic material into the first aeration tank results in a varied intensity of toxic stress to the sludge, wherein conditions for species competition is created and steady function of the system is maintained.

5. The method according to claim 1 where the purification system evolves towards steady state operation, wherein a selected thermophilic bacteria from the first aeration tank in the form of grains or biologically activated complexes are transferred to the second aeration tank.

6. The method according to any one of claims 1, 2, 3 and 5, wherein a) the first aeration tank operates under anoxic conditions resulting in the conversion of nitrates to nitrogen, b) the second aeration tank operates in oxidant conditions resulting in the conversion of ammoniates to nitrates which are continuously recycled with the sludge to the first aeration tank which results in the binding of 70–75% of a nitrogen containing material, and c) 60–75% of phosphates are removed with disposal of the sludge from the first aeration tank.

7. The method according to claim 1, where the activation of a biological culture is promoted in parallel by a thermophilic selection of a range of thermophilic microorganisms, and the rate and the effectiveness of the water cleaning system is increased.

8. The method according to claim 1, where if the contaminated water contains a high proportion of metal ions, said metal ions are bound by the introduction of the inflatable ion exchanging resins in the contaminated water or in a primary settlement tank of the system.

9. The method according to claim 1, wherein a) the first aeration tank acts as a toxicity trap and nitrate is removed, b) sludge produced in the first tank is rejected after 60–75% of the phosphate content is removed, c) active sludge from the second aeration tank is recycled to the first aeration tank, which results in a competition for survival of microorganisms which are activated, d) a thermophilic biological culture is developed in the second aeration tank, and e) the heavy metal ions are bound with the special ion exchanging resins which are inflatable in water by a factor of 300 and are placed in the second aeration tank.

10. The method according to claim 1, wherein the ion exchanging resins have a Mc value of 50,000 conversion products and contain sulfonic and carboxylic groups inserted to a maximum density to ion-exchange ratio of about 5.6–6.2.

* * * * *